(No Model.)
E. C. HALL.
COMBINED WATER FILTER AND COOLER.
No. 276,533. Patented Apr. 24, 1883.
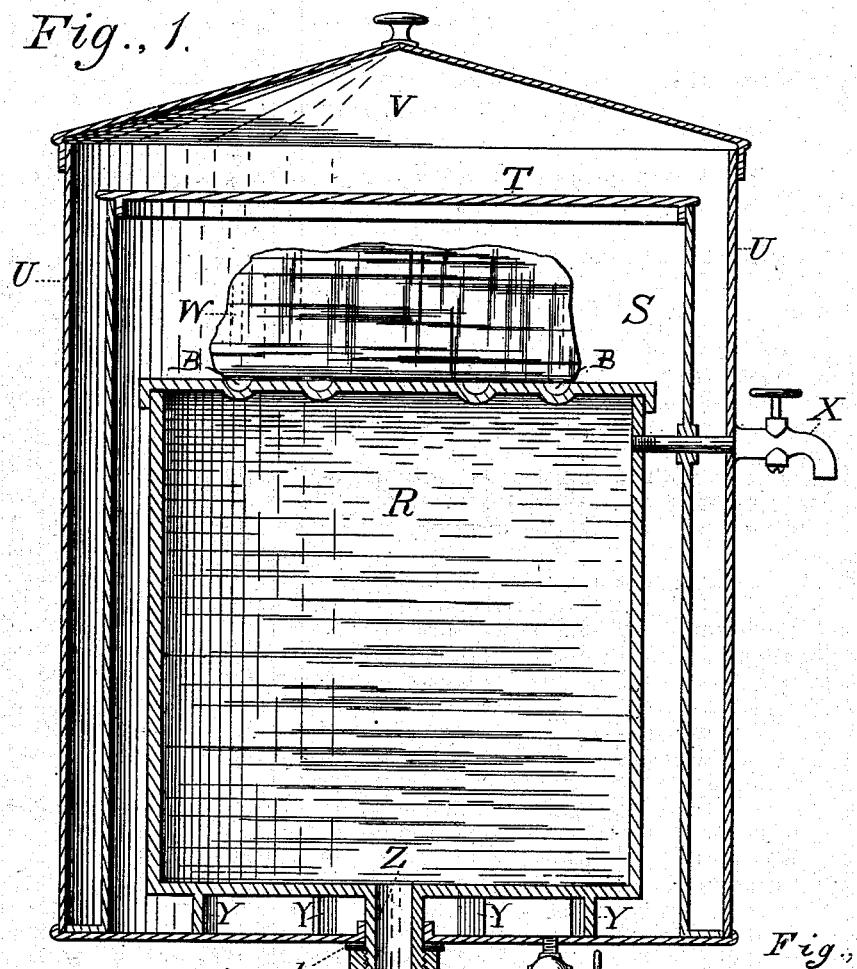
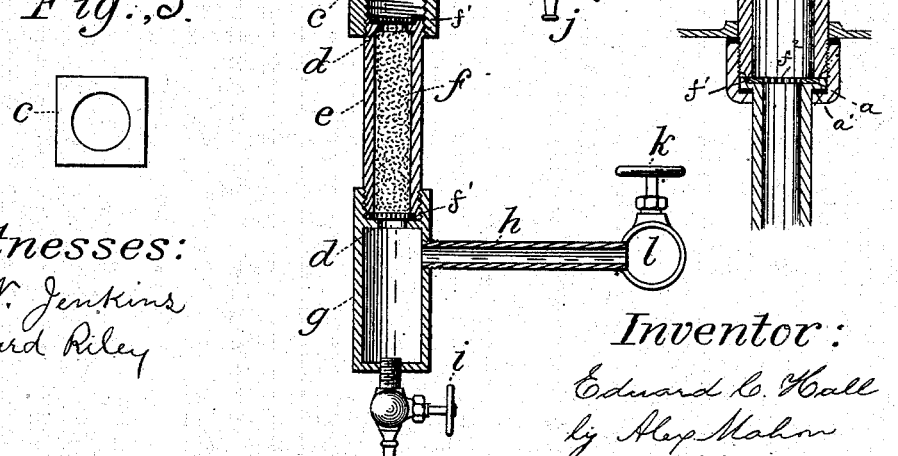
Witnesses:
H. N. Jenkins
Edward Riley
Inventor:
Edward C. Hall
by Alex Mahon
attorney

UNITED STATES PATENT OFFICE.

EDWARD C. HALL, OF AUBURN, NEW YORK, ASSIGNOR OF ONE-HALF TO FRANK E. CADY, OF SAME PLACE.

COMBINED WATER FILTER AND COOLER.

SPECIFICATION forming part of Letters Patent No. 276,533, dated April 24, 1883.

Application filed August 18, 1882. (No model.)

*To all whom it may concern:*

Be it known that I, EDWARD C. HALL, of Auburn, county of Cayuga, State of New York, have invented new and useful Improvements in a Combined Water Filter and Cooler, of which the following is a full and exact description, reference being had to the accompanying drawings, making part of this specification, in which—

Figure 1 is a vertical section of my improved cooler and filter. Fig. 2 is a vertical section through the lower end of the cooler, showing a modification in the form of coupling-joint for connecting the filter with the reservoir or cooler; and Fig. 3 is a plan or top view of the nut-coupling shown in Fig. 1.

My invention consists in the combination, with a cooling-reservoir for holding filtered water, having a filtering-chamber connected therewith, of a sediment-chamber and supply-pipe, as hereinafter described.

It also consists in the combination, with the cooling-reservoir located within an inclosing-case, of a filter connected to said reservoir outside of the inclosing-case for adapting said filter to be removed therefrom without disturbing the other parts.

It also consists in the combination, with the cooling, filtering, and sediment chambers, of the inclosing cases or shells, as hereinafter described.

It further consists in certain details in the construction and arrangement of parts, all as hereinafter set forth.

In the drawings, *e* represents the filter, which consists of a pipe or box having perforated plates or strainers *d*, fitted in the opposite ends thereof, and filled in between the same with any desired filtering material, as shown at *f*. The strainers consist of annular rings *f'* and central perforated plates, *f²*, adapted to fit in annular recesses formed in the ends of the filter, so that when the parts are in position the annular ring will be clamped between the adjacent ends of the filter and of either the inlet-pipe of the cooler or the upper end of the sediment-chamber.

Screwed or otherwise fitted to the lower end of the filter is a sediment-chamber, *g*, the lowest portion of which is provided with a faucet, *i*, for drawing off the dirty water and sediment accumulating therein. This chamber is connected at or near its top by a pipe, *h*, with the water-main *l*. The main is furnished with a check-valve, *k*, for regulating the flow of water into the filter. The purified water from the filter is collected in a reservoir, R, the under side of which is provided with an inlet-pipe, Z, to which the filter is connected by a right and left threaded coupling-sleeve, the outer surface of which is preferably made square, as shown in Fig. 3, to permit of the same being tightened by a wrench. In lieu of a coupling-sleeve, the connection may be made by a universal joint, as shown in Fig. 2. In this case the filter is provided with a flange, *a*, and a rubber washer or other packing, *a'*, so as to prevent any leak at said joint. The cover of the reservoir is constructed with annular grooves or corrugations B, so as to increase the surface thereof, as well as to keep the ice which is placed thereon from slipping off the same. Near the top of the reservoir is a faucet, X, through which the cold water is withdrawn. The reservoir R is provided with supporting-legs, as shown at Y, which rest on the bottom of the casing in which it is placed, so as to leave a space between said casing and the bottom of the cooler.

The form of casing which is preferably employed consists of two walls, S U, with a space between each, which may, if desired, be filled in with any non-conducting material. The inner wall is of less height than the outer one, and each is provided with a detachable cover, as shown at T V. The reservoir or cooler, however, is adapted to be fitted in any convenient form of closed case or vessel which will exclude the outside air, so as to prevent any reduction of temperature within the same. A cock, *j*, is fitted in the bottom of the inner casing for drawing off the drip from the ice. The water, being let on from the main pipe by means of the valve *k*, passes through the conducting-pipe *h* to the filter, gradually working up through the filtering compound into the cooling-reservoir until the latter is full, the sediment or mud contained in the water falling into the sediment-chamber attached to the under side of the filter, may be drawn off through the cock $i$, or the sediment-chamber may be removed from the filter for cleaning, as is found most convenient.

By the construction and arrangement of parts shown and described a constant supply of cool and filtered water is obtained, and the filter and sediment chambers are adapted to be readily removed for cleaning or for applying new filtering material without disturbing the other parts.

I am aware that devices similar to that shown in the patent to J. Foley, July 3, 1877, have been employed for filtering water; but,

Having now described my invention, I claim—

1. In a combined cooler and filter, a cooling-reservoir for holding the filtered water, having the filtering-chamber connected therewith, substantially as described, in combination with the sediment-chamber and the supply-pipe, all arranged as described, for the purpose set forth.

2. In combination with the inclosing-case and the cooling-chamber for filtered water, the filter $e$, located outside the inclosing-case and connected to the cooling-chamber by a suitable tube or pipe, substantially as described.

3. The cooling-chamber having the filtering and sediment chambers connected therewith, substantially as described, in combination with the inclosing shells or cases, for the purpose set forth.

4. The combination, with the cooling and filtering chambers connected together, substantially as described, of a sediment-chamber connected to said filtering-chamber by means of the screw-connection, for adapting it to be removed therefrom, for the purpose set forth.

In testimony whereof I have hereunto set my hand this 10th day of August, A. D. 1882.

EDWARD C. HALL.

Witnesses:
JOHN T. PINGREE,
W. R. HOPKINS.